US011119194B2

United States Patent
Isono

(10) Patent No.: US 11,119,194 B2
(45) Date of Patent: Sep. 14, 2021

(54) LASER RADAR DEVICE

(71) Applicant: DENSO CORPORATION, Kariya (JP)

(72) Inventor: Masashi Isono, Kariya (JP)

(73) Assignee: DENSO CORPORATION, Kariya (JP)

( * ) Notice: Subject to any disclaimer, the term of this patent is extended or adjusted under 35 U.S.C. 154(b) by 540 days.

(21) Appl. No.: 16/072,338

(22) PCT Filed: Jan. 13, 2017

(86) PCT No.: PCT/JP2017/000931
§ 371 (c)(1),
(2) Date: Jul. 24, 2018

(87) PCT Pub. No.: WO2017/130729
PCT Pub. Date: Aug. 3, 2017

(65) Prior Publication Data
US 2019/0041500 A1    Feb. 7, 2019

(30) Foreign Application Priority Data

Jan. 28, 2016 (JP) .............................. JP2016-014853
Dec. 7, 2016 (JP) ................................. 2016-237837

(51) Int. Cl.
*G01S 7/00* (2006.01)
*G01S 7/481* (2006.01)
(Continued)

(52) U.S. Cl.
CPC .......... *G01S 7/4817* (2013.01); *G01S 7/4813* (2013.01); *G01S 17/42* (2013.01); *G01S 17/88* (2013.01); *G02B 26/10* (2013.01); *G02B 26/12* (2013.01)

(58) Field of Classification Search
USPC ........................................................ 356/5.01
See application file for complete search history.

(56) References Cited

U.S. PATENT DOCUMENTS

| | | | |
|---|---|---|---|
| 6,400,448 B1 * | 6/2002 | Sugawara | G01S 7/4863 356/5.01 |
| 10,424,722 B2 * | 9/2019 | Matsuda | H02N 2/186 |
| 2017/0155035 A1 * | 6/2017 | Matsuda | G01C 19/5663 |

FOREIGN PATENT DOCUMENTS

| | | |
|---|---|---|
| JP | S52-029603 B2 | 8/1977 |
| JP | S64-062613 A | 3/1989 |

(Continued)

OTHER PUBLICATIONS

English Translation of International Search Report for PCT/JP2017/000931 (14 pages) (Year: 2017).*

*Primary Examiner* — James R Hulka
(74) *Attorney, Agent, or Firm* — Maschoff Brennan

(57) ABSTRACT

An emission lens shapes laser light from a laser light source. A scanning mirror changes its posture and reflects the laser light toward an outside. A scanning substrate controls the posture of the scanning mirror. A light receiving device on a light receiving substrate receives the light reflected on a target. A light receiving lens condenses the reflected light on the light receiving device. A housing houses the light source substrate, the emission lens, the scanning mirror, the scanning substrate, the light receiving substrate, and the light receiving lens. An innermost member is one of the emission lens, the scanning mirror, and the light receiving lens having an end portion on an innermost side of the housing in a depth direction. The light source substrate, the scanning substrate, and the light receiving substrate do not overlap with the innermost member in the depth direction of the housing.

14 Claims, 10 Drawing Sheets

(51) Int. Cl.
*G01S 17/42* (2006.01)
*G02B 26/12* (2006.01)
*G01S 17/88* (2006.01)
*G02B 26/10* (2006.01)

(56) References Cited

FOREIGN PATENT DOCUMENTS

| | | |
|---|---|---|
| JP | H07-092270 A | 4/1995 |
| JP | H11-326499 A | 11/1999 |
| JP | 2002-031685 A | 1/2002 |
| JP | 2011-180103 A | 9/2011 |
| JP | 2015-206590 A | 11/2015 |

* cited by examiner

LASER RADAR DEVICE

CROSS REFERENCE TO RELATED APPLICATION

This application is based on Japanese Patent Applications No. 2016-14853 filed on Jan. 28, 2016 and No. 2016-237837 filed on Dec. 7, 2016, the disclosure of which is incorporated herein by reference.

TECHNICAL FIELD

The present disclosure relates to a laser radar device.

BACKGROUND ART

Conventionally, a known laser radar device sweeps and irradiates a pulse laser light discontinuously within a predetermined angle range so as to form a predetermined detection area. The laser radar device of this type includes an irradiation unit that irradiates a laser light, a scanning device that changes an irradiation direction of the laser light to the outside of a housing, a light receiving unit that receives a reflected light obtained from the laser light reflected and returned by an object, a distance calculation unit that calculates a distance to the object (hereinafter referred to as a target) from which the laser light is reflected based on a time from the irradiation of the laser light to the reception of the reflected light, and the housing that houses those components.

The irradiation unit includes a light source substrate on which a laser diode as a laser light source and an IC that controls the driving of the laser diode are mounted, and an emission lens that shapes the laser light output from the laser diode. In addition, the light receiving unit includes a light receiving lens and a light receiving substrate. The light receiving lens shapes the reflected light from the target and condenses the shaped light on a light receiving surface of a light receiving device. The light receiving substrate is mounted with the light receiving device that outputs an electric signal corresponding to an intensity of the light irradiated from the light receiving lens. The distance calculation unit is produced with the use of a CPU and an IC.

The housing is provided with an emission window for emitting an irradiation light to the outside of the housing and a light receiving window for guiding the reflected light from the target to the light receiving lens. Various configurations have also been proposed in which the emission window serves also as the light receiving window.

As a layout in which various components are located in the housing, for example, Patent Literature 1 discloses a configuration in which components of a light receiving system are aligned in a row in a depth direction of the laser radar device. In this example, the components of the light receiving system mainly refer to the light receiving lens and the light receiving substrate. The depth direction of the laser radar device corresponds to a direction opposite to a direction in which a center (that is, an optical axis) of an angle range in which the laser light is irradiated is directed.

In this case, it is desirable to reduce a thickness of the laser radar device. In particular, when the laser radar device is mounted on a vehicle, since a mounting space around a body is finite, a further reduction in thickness of the laser radar device is required. However, in the configuration of Patent Literature 1, since the components of the light receiving system are aligned in a row in the depth direction, a length (that is, the thickness) of the laser radar device in the depth direction increases as much.

PRIOR TECHNICAL LITERATURE

Patent Literature

PATENT LITERATURE 1: JP 2015-206590 A

SUMMARY OF INVENTION

It is an object of the present disclosure to provide a laser radar device that reduces a length of the laser radar device in a depth direction.

According to one aspect of the present disclosure, a laser radar device is configured to acquire distance information on a target, which exists in a detection area corresponding to a predetermined angle range, by sweeping and irradiating a laser light in the angle range. The laser radar device comprises a light source substrate on which a laser light source to output the laser light is located. The laser radar device further comprises an emission lens configured to shape the laser light from the laser light source and to output the laser light. The laser radar device further comprises a scanning mirror configured to reflect the laser light from the emission lens toward an outside of a housing and to change its posture relative to the laser light source. The laser radar device further comprises a scanning substrate configured to control the posture of the scanning mirror relative to the laser light source. The laser radar device further comprises a light receiving substrate on which a light receiving device is located, the light receiving device configured to receive a reflected light, which is the laser light reflected on the target, and to output an electric signal corresponding to an intensity of the received reflected light. The laser radar device further comprises a light receiving lens configured to condense the reflected light on the light receiving device. The laser radar device further comprises the housing that houses the light source substrate, the emission lens, the scanning mirror, the scanning substrate, the light receiving substrate, and the light receiving lens. An innermost member is one of the emission lens, the scanning mirror, and the light receiving lens having an end portion on an innermost side of the housing in a depth direction. The light source substrate, the scanning substrate, and the light receiving substrate are located at positions not to overlap with the innermost member in the depth direction of the housing.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
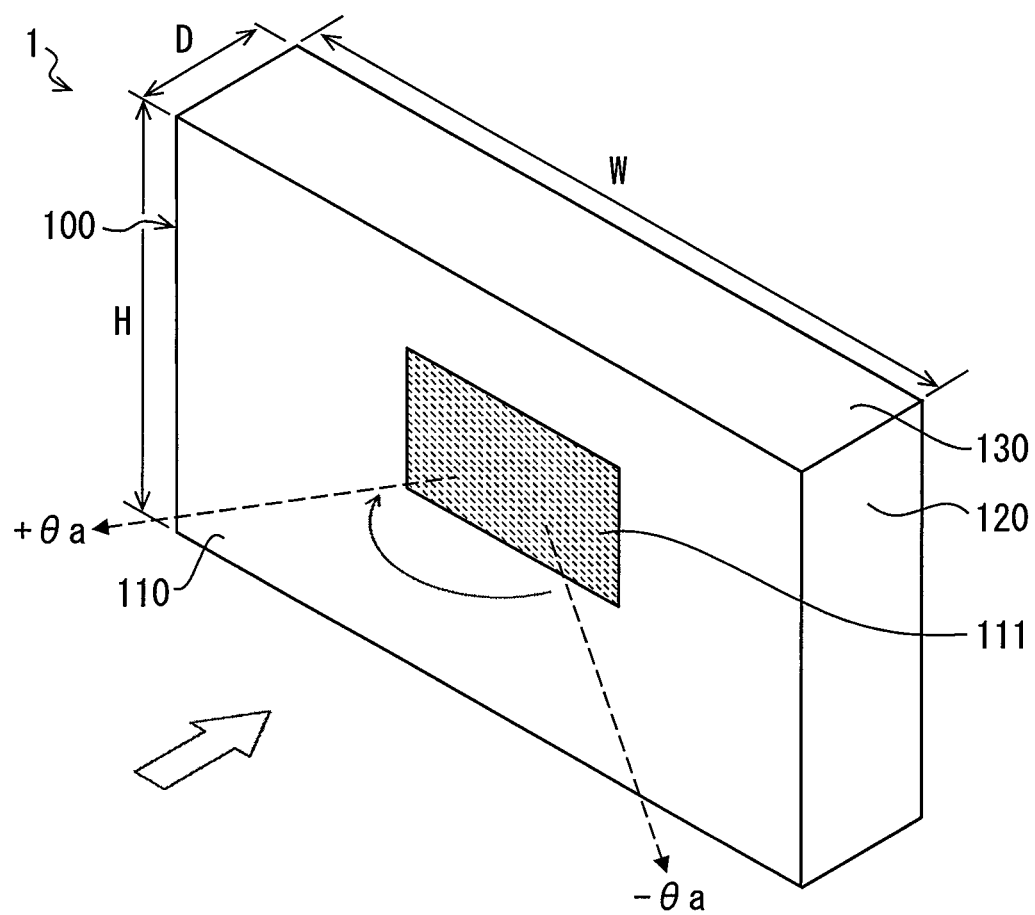
FIG. 1 is an external perspective view showing a laser radar device 1.

Hereinafter, embodiments of the present disclosure will be described with reference to the accompanying drawings. FIG. 1 is a schematic perspective view of an exterior of a laser radar device 1 according to the present disclosure. As shown in FIG. 1, the laser radar device 1 includes a housing 100 having a rectangular parallelepiped shape having a height H [mm], a lateral width W [mm], and a depth D [mm], and a front side surface (hereinafter referred to as front portion) 110 of the housing 100 is provided with a light emission and receiving window 111 for emitting and receiving a laser light.

In an example of the present embodiment, a configuration in which the shape of the housing 100 is a rectangular parallelepiped is exemplified, but the present invention is not limited to the above configuration. For example, the front portion 110 may be formed in an arc shape having a predetermined radius of curvature when viewed from a top. The rectangular parallelepiped shape also includes a substantially rectangular parallelepiped shape. The substantially rectangular parallelepiped shape refers to a shape based on a rectangular parallelepiped whose corners are chamfered or partially deformed. The shape itself of the housing 100 is a design matter.

A height direction and a width direction correspond to a vertical direction and a lateral direction of a posture assumed in advance as a posture when the laser radar device 1 is in use. A depth direction is a direction heading from a front side to a surface on a side facing the front portion 110 (that is, a back side). The depth direction corresponds to a direction parallel to a center (so-called optical axis) of an angle range where the laser radar device 1 irradiates the laser light. Specific values of the height H, the width W, and the depth D of the housing 100 may be appropriately designed so as to accommodate various members to be described later.

The laser radar device 1 discontinuously sweeps and radiates (so-called scanning) the laser light in a predetermined angle range from −θa to +θa in the width direction, to thereby acquire information on a distance to a target existing in a direction of irradiating the laser light. θa is a value designed as appropriate, and may be set to, for example, 60 degrees. In an example of the present embodiment, a configuration of sweeping and irradiating the laser light in the width direction is exemplified, but a configuration of sweeping and irradiating the laser light in the height direction may be employed. Further, a configuration of sweeping and irradiating the laser light in a predetermined angle range in each of the width direction and the height direction may be employed. The range where the laser light is scanned and irradiated corresponds to a detection area.

In an example of the present embodiment, it is assumed that a connector (hereinafter referred to as relay connector) for connection to a cable for communicating with an electronic control unit (ECU) installed outside the laser radar device 1 is located on a left side surface portion (hereinafter, a left surface portion) of the housing 100. The relay connector is located at a position as close as possible from a position (hereinafter referred to as a cable lead position) where the cable for connecting to the laser radar device 1 is pulled out in the vehicle.

Figure 2:
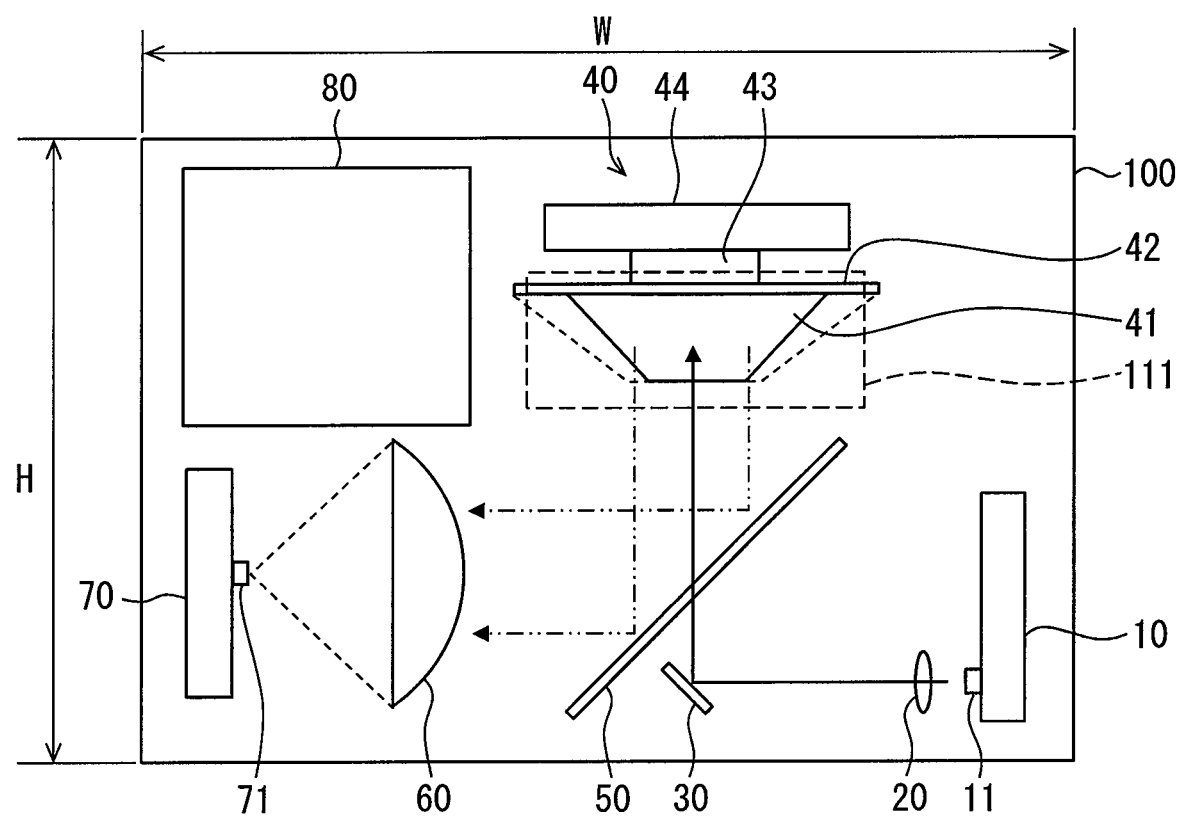
FIG. 2 is a front view showing the laser radar device 1.
Figure 3:
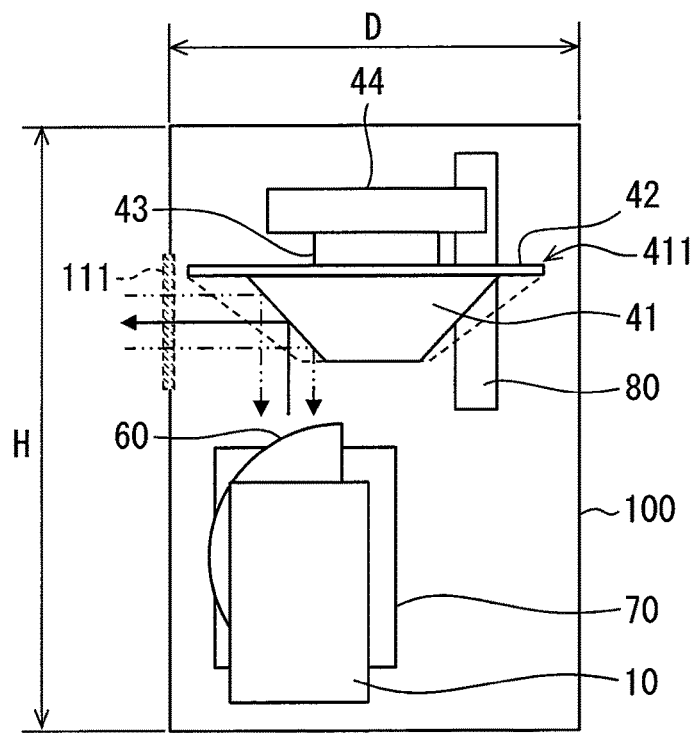
FIG. 3 is a side view showing the laser radar device 1.
Figure 4:
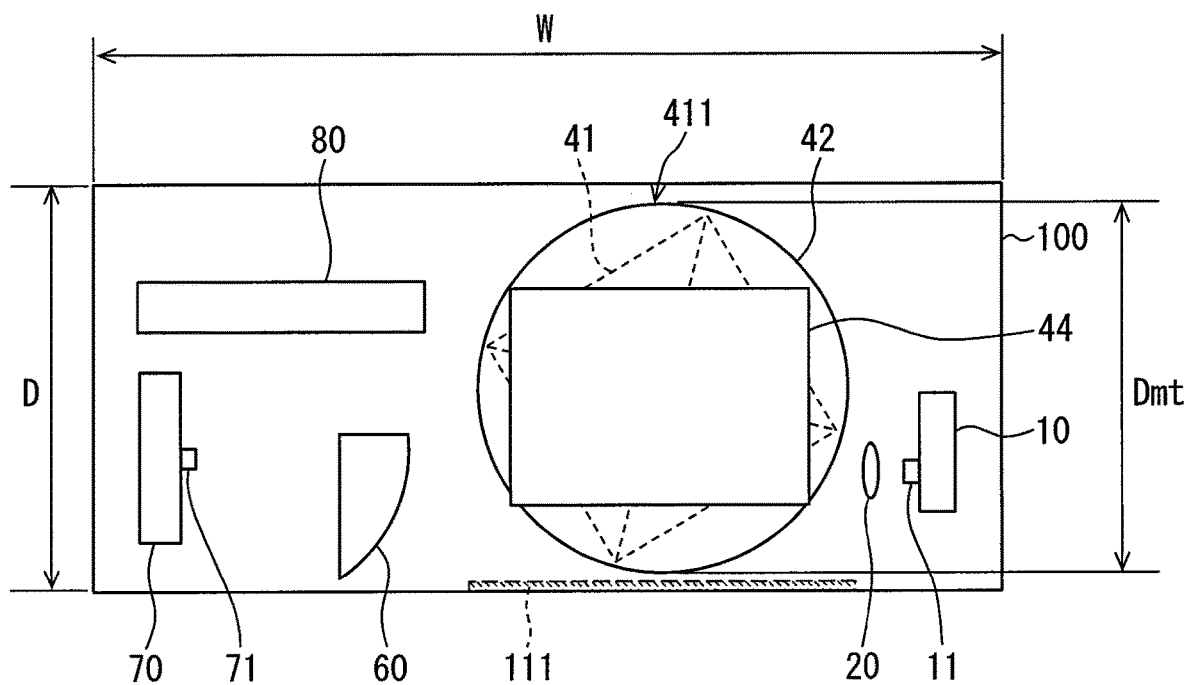
FIG. 4 is a top view showing the laser radar device 1.

Main components of the laser radar device 1 housed inside the housing 100 will be described below. FIG. 2 is a front view of the laser radar device 1 when seeing through the front portion 110, FIG. 3 is a side view of the housing 100 as viewed from the right, and FIG. 4 is a top view of the laser radar device 1. In FIG. 3, a right side surface portion (hereinafter referred to as a right surface portion) 120 of the housing 100 is seen through, and in FIG. 4, an upper side portion (hereinafter, an upper surface portion) 130 is seen through.

As shown in FIGS. 2 to 4, the laser radar device 1 includes a light source substrate 10, an emission lens 20, an emission light guide mirror 30, a scanner 40, a light receiving light guide mirror 50, a light receiving lens 60, a light receiving substrate 70, and a main control substrate 80. The light source substrate 10 is provided with a laser diode 11 that emits the laser light, and a light receiving device 71 is located on the light receiving substrate 70. The scanner 40 includes a polygon mirror 41, a pedestal portion 42, a motor 43, and a scanning substrate 44. Each of the light source substrate 10, the scanning substrate 44, and the light receiving substrate 70 is connected to the main control substrate 80 so as to communicate with each other, for example, with the use of a flexible cable or the like.

The light source substrate 10 outputs a pulse laser light to the laser diode 11 based on a light emission instruction signal input from the main control substrate 80. A pulse width of the laser light to be emitted may be, for example, 20 nanoseconds or the like. The laser diode 11 corresponds to a laser light source.

The emission lens 20 is a lens for shaping the laser light. The emission lens 20 shapes the pulse laser light output from the laser diode 11 and outputs the shaped pulse laser light in a direction in which the emission light guide mirror 30 is present.

The emission light guide mirror 30 is a planar mirror (that is, a planar mirror) that reflects the laser light output from the emission lens 20 in a direction in which the polygon mirror 41 is present. The laser light output by the laser diode is shaped by the emission lens 20, further reflected by the emission light guide mirror 30, and is incident on the polygon mirror 41. A solid arrow shown in the figures conceptually indicates a path of the laser light output from the laser diode 11. The emission light guide mirror 30 corresponds to an emission path bending member.

The scanner 40 is a unit for controlling a direction in which the laser light is emitted to the outside of the housing. The scanner 40 includes the polygon mirror 41 as a reflector, the pedestal portion 42 for supporting the polygon mirror 41, the motor 43 for rotating the polygon mirror 41 around an axis parallel to the height direction (hereinafter referred to as a rotation axis), and the scanning substrate 44 for controlling the driving of the motor 43. The polygon mirror 41 is provided on the pedestal portion 42 so as to be rotatable around the rotation axis.

A motor driver circuit for driving the motor 43 is mounted on the scanning substrate 44 based on the drive signal input from the main control substrate 80. The scanning substrate 44 drives the motor 43 based on the drive signal from the main control substrate 80 to rotate the polygon mirror 41.

The rotation angle of the motor 43 relative to an initial position (in other words, the polygon mirror 41) is detected by a motor rotational position sensor and output to the main control substrate 80. The motor rotational position sensor may be realized with the employment of a well-known configuration. For example, a magnet or the like may be provided for each of a rotating member and a non-rotating member, and a rotational angle may be detected from a temporal change in a magnetic force acting between the magnets. A rotation direction of the polygon mirror 41 may be appropriately designed, for example, the polygon mirror 41 may rotate clockwise around the rotation axis in the vertical direction.

In the polygon mirror 41, four reflection surfaces are formed on a side surface around the rotation axis. Each reflection surface is formed to have a predetermined inclination angle (in this example, 45 degrees) relative to the rotation axis. In other words, the polygon mirror 41 has the same shape (in other words, frustum shape) as that of one of two solids generated by cutting a quadrangular pyramid having a square bottom surface along a plane parallel to the bottom surface, including the bottom surface of the original quadrangular pyramid.

For the sake of convenience, one of the two square surfaces of the polygon mirror 41 facing each other in the height direction, which is larger in area is referred to as a first surface, and the other surface which is smaller in area is referred to as a second surface. The polygon mirror 41 is located such that the first surface is located on a side upper than the second surface in the housing.

The laser light incident from the emission light guide mirror 30 is reflected by any of the four reflection surfaces of the polygon mirror 41 and is emitted to the outside of the housing. While the incident light from the emission light guide mirror 30 is being reflected by the same reflection surface, the emission direction of the laser light changes in the horizontal direction by rotation about the rotation axis. For that reason, the main control substrate 80 intermittently radiates the laser light from the laser diode while rotating the polygon mirror 41 at a predetermined speed, thereby being capable of sweeping and irradiating (in other words, scanning) the laser light within a predetermined angle range in the horizontal direction.

In addition, the polygon mirror 41 reflects the laser light (that is, reflected light) obtained by reflecting and returning the emitted laser light on the target present outside the housing, in the direction where the light receiving light guide mirror 50 is present. In other words, the polygon mirror 41 not only emits the laser light entering from the emission light guide mirror 30 to the outside of the housing, but also reflects the reflected light to the interior of the housing to guide the reflected light to the light receiving device 71 through the light receiving light guide mirror 50 and the light receiving lens 60, which will be described later. Double-dotted chain arrows shown in the figures conceptually indicate a path of the reflected light.

In FIGS. 2 and 3, a broken line shown around the polygon mirror 41 indicates an outline of a rotating body (hereinafter referred to as polygon mirror rotating body) formed by rotating the polygon mirror 41. Since the polygon mirror 41 has a truncated cone shape, the polygon mirror rotating body has a truncated cone shape. In the polygon mirror rotating body, a diameter Dmt (hereinafter referred to as the rotating body diameter) of a circular surface corresponding to the first surface of the polygon mirror 41 corresponds to a length of a diagonal line of the first surface of the polygon mirror 41.

Reference numeral 411 in FIGS. 3 and 4 indicates a position (hereinafter referred to as a mirror innermost position) of the polygon mirror 41 on an innermost side where a vertex of the first surface can be located when the polygon mirror 41 is rotated around the rotation axis. The mirror innermost position 411 corresponds to a position of the end portion on the innermost side in the polygon mirror rotating body.

As described above, the pedestal portion 42 is a plate-like member for supporting the polygon mirror 41 and a shape of the pedestal portion 42 is substantially the same as that of a surface corresponding to the first surface of the polygon mirror 41 of the polygon mirror rotating body. The pedestal portion 42 is an arbitrary element. A broken line shown in FIG. 4 indicates a position of the polygon mirror 41 located below the pedestal portion 42.

The light receiving light guide mirror 50 is provided at a position at which the reflected light reflected by the polygon mirror 41 arrives and reflects the reflected light reflected by the polygon mirror 41 in the direction in which the light receiving lens 60 is present. The light receiving light guide mirror 50 corresponds to a light receiving path bending member.

Figure 5:
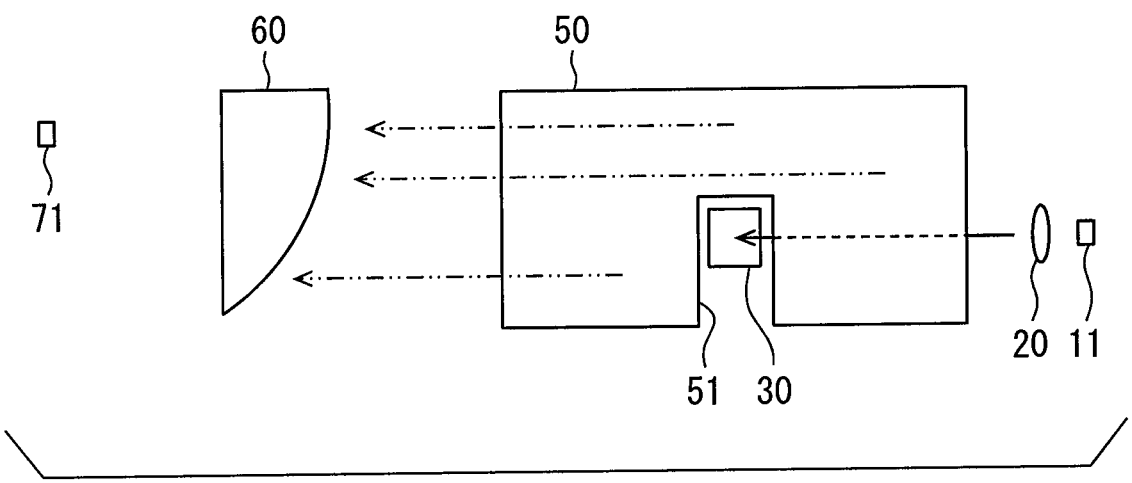
FIG. 5 is a diagram illustrating a configuration of a light receiving light guide mirror 50.

The light receiving light guide mirror 50 may be a member that reflects the laser light. Since the light receiving light guide mirror 50 guides the reflected light incident into the housing 100 from the target through the polygon mirror 41 to the light receiving lens 60 as much as possible, the area is relatively large as compared with the emission light guide mirror 30. For example, as shown in FIG. 5, the light receiving light guide mirror 50 is provided with a notch 51 so as not to obstruct a path of the laser light from the emission light guide mirror 30 to the polygon mirror 41. FIG. 5 is a top view of the vicinity of the light receiving light guide mirror 50. In FIG. 3, illustration of the light receiving light guide mirror 50 is omitted.

The light receiving lens 60 is a light transmissive convex lens made of a synthetic resin, glass, or the like, and shapes the laser light (that is, the reflected light from the target) coming from the direction in which the light receiving light guide mirror 50 is present, and focuses the shaped laser light on the light receiving surface of the light receiving device 71. In the present embodiment, as an example, it is assumed that a portion of the light receiving lens 60 which is closer to the housing depth side than the rotation axis of the polygon mirror 41 is cut off as shown in FIGS. 3 and 4. This is because the reflected light from the polygon mirror 41 does not arrive at the portion on the housing depth side relative to the rotation axis of the polygon mirror 41. This reduces a space required for disposing the light receiving lens 60. The shape of the light receiving lens 60 may be appropriately designed.

The light receiving device 71 is an element that converts a light into an electric signal. The light receiving device 71 outputs a voltage having a magnitude corresponding to the intensity of the reflected light as a light reception signal. As the light receiving device 71, for example, an avalanche photodiode or the like can be employed.

An amplifier for amplifying the light reception signal output from the light receiving device 71 is provided on the light receiving substrate 70 in addition to the light receiving device 71. The amplifier amplifies the light receiving signal output from the light receiving device 71 with a predetermined amplification factor and outputs the amplified signal to the main control substrate 80. The amplifier may be realized by a known circuit configuration using, for example, an operational amplifier or the like. A ratio of amplifying the light reception signal (that is, the amplification factor) is adjusted based on an amplification factor control signal input from the main control substrate 80. In other words, the amplifier amplifies the light reception signal with an amplification factor corresponding to the amplification factor control signal input from the main control substrate 80. The light reception signal amplified by the amplifier is output to a light receiving processing unit 82 included in the main control substrate 80.

Figure 6:
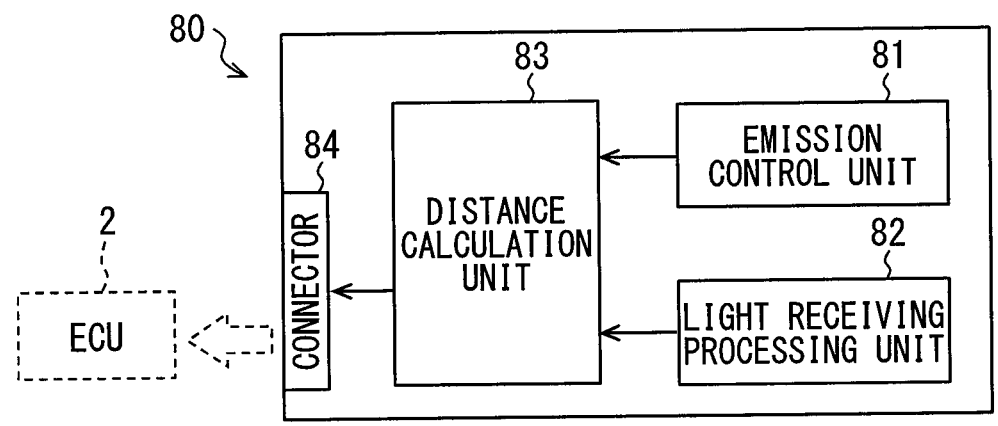
FIG. 6 is a functional block diagram illustrating an example of a schematic configuration of a main control substrate 80.

The main control substrate 80 is a substrate on which functions for controlling the overall operation of the laser radar device 1 are implemented. As shown in FIG. 6 as a functional block, the main control substrate 80 includes an emission control unit 81, the light receiving processing unit 82, and a distance calculation unit 83. A connector 84 for communicating with the ECU 2 through a relay connector (not shown) is located on the main control substrate 80. In addition to the configuration described above, a power supply circuit module for controlling the power supply to the respective components of the laser radar device 1 may be mounted on the main control substrate 80.

The respective functional blocks may be realized by the CPU executing a predetermined program, or may be realized as a circuit module using one or multiple ICs or various circuit elements. Alternatively, the respective functional blocks may be realized by combining execution of predetermined software by the CPU with hardware. Further, the respective functional blocks may be mounted on a substrate as firmware.

In this example, it is assumed that the various functional blocks are realized by the CPU executing a program stored in a nonvolatile storage medium (for example, ROM). It should be noted that a program (hereinafter referred to as main control program) and the like for causing a normal computer to function as the distance calculation unit 83 or the like may be stored in a non-transitory tangible recording medium. Execution of the main control program by the CPU corresponds to execution of a method corresponding to the main control program.

The emission control unit 81 is a functional block for controlling a timing and the like of emitting the pulse laser light in cooperation with the light source substrate 10 and the scanning substrate 44. More specifically, the emission control unit 81 outputs a drive signal to the scanning substrate 44 to rotate the motor 43. Further, the emission control unit 81 outputs a light emission instruction signal to the light source substrate 10 at a timing corresponding to the rotation angle of the polygon mirror 41 input from the scanning substrate 44. In other words, the emission control unit 81 emits the pulse laser light at a timing synchronized with the rotation of the polygon mirror 41 at a predetermined interval. As a result, the pulse laser light is swept and irradiated in a predetermined angle range so as to form a desired detection area.

In addition, the emission control unit 81 provides the distance calculation unit 83 with information indicating the timing at which the pulse laser light is emitted. In this example, it is assumed that the emission control unit 81 outputs an emission notification signal indicating that emission of the pulse laser light has been instructed to the distance calculation unit 83 at the same time as outputting the light emission instruction signal. According to the configuration described above, the distance calculation unit 83 recognizes the timing at which the emission notification signal is input as the timing at which the pulse laser light is emitted.

When the light source substrate 10 is configured so as to adjust an output level of the laser diode 11, the emission control unit 81 may output the output level instruction signal indicating the output level to the light source substrate 10. According to the embodiment described above, the emission control unit 81 can cause the laser diode 11 to emit the laser light having an arbitrary intensity.

The light receiving processing unit 82 detects that the reflected light has been received based on a temporal change of the light reception signal. For example, when the magnitude of the light reception signal exceeds a predetermined light reception determination threshold, the light receiving processing unit 82 determines that the reflected light has been received. The light reception determination threshold value is a threshold value for determining that reflected light has been received according to the magnitude of the light reception signal, and a specific threshold may be appropriately designed. In addition, the determination as to whether the magnitude of the received light signal exceeds the light reception determination threshold, or not, may be performed with the use of a comparator or the like.

Upon detection of the reception of the reflected light, the light receiving processing unit 82 outputs a signal indicating the reception (hereinafter referred to as a light reception notification signal) to the distance calculation unit 83. The light receiving processing unit 82 may have a function of converting the light reception signal input from the light receiving substrate 70 into a digital signal, or removing noise components from the light reception signal with the use of a well-known high-pass filter or the like, as a preparatory process to determine whether the reflected light is received, or not. The light receiving processing unit 82 implements a function of executing signal processing for extracting information necessary for a distance calculation process from the light reception signal input from the light receiving substrate 70. In addition, the light receiving processing unit 82 outputs an amplification factor control signal to the amplifier provided on the light receiving substrate 70, and adjusts the amplification factor.

The distance calculation unit 83 specifies an emission timing based on the input of the emission notification signal from the emission control unit 81. Also, the distance calculation unit 83 specifies the timing of receiving the reflected light based on the input of the light reception notification signal from the light receiving processing unit 82. As a result, the distance calculation unit 83 specifies a flight time from the emission of the pulse laser light to the reception of the reflected light. Measurement of flight time may be carried out with the use of a timer not shown.

The distance calculation unit 83 calculates a distance to the target in the direction along which the laser light is irradiated based on the flight time. A well-known method may be applied to the method of calculating the distance to the target based on the flight time. For example, a value obtained by dividing a value obtained by multiplying the flight time by a light propagation speed by 2 may be used as the distance to the target. The process of calculating the distance to the target corresponds to the distance calculation process. The calculation result of the distance calculation unit 83 is provided to the ECU 2 existing outside the laser radar device 1 through the connector 84.

When the laser radar device 1 is mounted on the vehicle so as to sweep and irradiate the laser light on the front of the vehicle, the information on the distance to the target detected by the laser radar device 1 can be used for, for example, a traveling control that keeps an inter-vehicle distance between the subject vehicle and a preceding vehicle. It is needless to say that the information on the distance to the target detected by the laser radar device 1 can also be used, for example, for self-driving, automatic brake control for avoiding collision, identification of a target type, and the like. The ECU 2 may be a device that executes the vehicle control described above and the like based on the detection result of the laser radar device 1.

The configuration of mounting the laser radar device 1 in the vehicle is not limited to the example described above. The laser radar device 1 may be mounted so as to sweep and irradiate the laser light in a rearward direction of the vehicle or in other directions. It should be noted that a mounting position of the laser radar device 1 in the vehicle may be set to a properly selected position in a peripheral edge of the vehicle body such as a front bumper, a front grill, a vehicle door, or a rear bumper. However, it is assumed that the laser light arrives at the outside of the vehicle and forms a desired detection area. The laser radar device 1 may be mounted on other than the vehicle.

<Details of Positional Relationships of Respective Members in Housing 100>

In this example, the shapes of the respective components housed in the housing 100 described above and the placements of the respective components inside the housing 100 described above will be described in more detail. In this example, it is assumed that a member having the maximum length in the depth direction when the respective members are housed in the housing 100 is the polygon mirror 41, and the configurations and placements of the respective members will be described.

First, as shown in FIG. 2, the light source substrate 10 is located so that a surface of the light source substrate 10 on a side where the laser diode 11 is not located (hereinafter referred to as a light source solder surface) at a lower right corner inside the housing 100 faces the right surface portion 120 of the housing 100, and a depth side end portion of the light source substrate 10 is located on a side closer to the front portion 110 (in other words, on a front side) than the mirror innermost position 411. As a precondition, it is assumed that a length of the light source substrate 10 in its depth direction is formed to be shorter than the rotating body diameter Dmt. The light source substrate 10 is located so that the light source solder surface faces the right surface portion 120, whereby a center of an irradiation angle range of the laser diode 11 faces the left side of the housing. The center of the irradiation angle range of the laser diode 11 corresponds to an optical axis of the laser diode 11.

It should be noted that the term "left and right" in the present specification refers to the left and right when viewing the housing 100 in a direction of a hollow arrow shown in FIG. 1 (in other words, in a front view). Further, the up and down in the present specification is up and down when viewing the laser radar device 1 from the front. Both of the up and down and right and left are directions orthogonal to the depth direction. The lower right corner of the housing 100 refers to a space that is further a lower half of a space that becomes the right half of the housing 100. Further, the depth end portion of a certain member means an end portion which is the innermost side in the depth direction of the member.

The emission lens 20 is located in a posture in which an optical axis of the laser diode 11 coincides with an optical axis of the emission lens 20 on an optical axis of the laser diode 11 and at a position where a distance from the laser diode 11 to the emission lens 20 becomes a focal length of the emission lens 20. As a result, the laser light emitted from the laser diode 11 is located to travel parallel to the width direction from the right side to the left side of the housing through the emission lens 20. The emission lens 20 and the light source substrate 10 are located so that the position of the emission lens 20 in the width direction is located on the right side of the rotation axis of the polygon mirror 41.

The emission light guide mirror 30 is located so as to reflect the laser light incident from the emission lens 20 directly above on a half straight line from the laser diode 11 toward the emission lens 20. The position of the emission light guide mirror 30 in the width direction is made to coincide with the width direction position where the rotation axis of the polygon mirror 41 is located.

The scanner 40 is located in a region located a relatively upper side in the housing 100 so that the rotation axis of the polygon mirror 41 coincides with the vertical direction of the housing, and the laser light incident from the emission light guide mirror 30 is reflected by the reflection surface so as to be emitted to the outside of the housing.

The scanning substrate 44 is located on the upper side of the polygon mirror 41 so as to face the upper surface portion 130. The scanning substrate 44 is located so that the length of the scanning substrate 44 in the depth direction is formed to be shorter than the rotating body diameter Dmt, and the depth end portion of the scanning substrate 44 in the depth direction is located on the front side of the mirror innermost position 411.

As described above, the light receiving light guide mirror 50 is located so as to reflect the reflected light incident from the polygon mirror 41 to the left side of the housing on the path along which the reflected light reflected by the polygon mirror 41 travels. The placement position of the light receiving light guide mirror 50 in the width direction is a position where the position of the center of the light receiving light guide mirror 50 in the width direction coincides with the position of the rotation axis of the polygon mirror 41 in the width direction. The configuration described above corresponds to a configuration in which the emission light guide mirror 30 and the light receiving light guide mirror 50 are located on a straight line (hereinafter referred to as a center optical path) where the reflected light from the target travels, which is reflected by the polygon mirror 41. The center optical path corresponds to a straight line through which the laser light reflected by the emission light guide mirror 30 passes.

The light receiving lens 60 is located at a position where most of the laser light reflected by the light receiving light guide mirror 50 is incident, in a posture in which the optical axis of the light receiving lens 60 coincides with the direction in which the light receiving light guide mirror 50 reflects the reflected light. In other words, the light receiving lens 60 is located so that the optical axis coincides with the width direction of the housing 100 and the optical axis passes through the center of the light receiving light guide mirror 50 in the region on the left side of the housing.

The light receiving substrate 70 is located so that the light receiving device 71 is located at the focal point on the left side of the light receiving lens 60 in a posture where the light receiving substrate 70 faces the left surface portion of the housing 100. The light receiving substrate 70 is located so that the length of the scanning substrate 44 in the depth direction is formed to be shorter than the rotating body diameter Dmt, and the depth end portion of the scanning substrate 44 in the depth direction is located on the front side of the mirror innermost position 411.

The main control substrate 80 is located to face a side surface portion (hereinafter referred to as back surface portion) on a back side of the housing 100 in a space that is an upper left corner inside the housing 100, specifically, a space that is on the left side of the scanner 40 and above the light receiving lens 60. In other words, the main control substrate 80 is located at a position not overlapping with the scanner 40 and the light receiving lens 60 when viewed from the front direction. However, the main control substrate 80 is positioned in front of the mirror innermost position 411 in the space.

The configuration described above corresponds to a configuration in which the main control substrate 80 is provided in a position relatively close to a relay connector provided in the housing 100 in the internal space of the housing 100. According to the configuration described above, a length of the cable that connects the relay connector and the connector 84 can be reduced. Further, in an example of the present embodiment, it is assumed that the connector 84 is located on one of edges of the main control substrate 80, which faces the left surface portion of the housing 100. According to the configuration described above, the distance from the relay connector provided in the housing 100 is shortened, thereby being capable of further shortening the length of the cable accommodated in the housing 100.

Overview of Embodiment

Next, the configuration and effects of the present embodiment will be summarized. In the embodiment described above, the polygon mirror 41 functions as the innermost member, which is an optical member having an end portion on the innermost side in the depth direction of the housing 100 among the various optical members, and also functions as an optical member (hereinafter referred to as "member having a maximum depth length") having the maximum length in the depth direction when the polygon mirror 41 is housed in the housing.

In this example, the optical member refers to a member that reflects and refracts the laser light, such as the emission lens 20, the emission light guide mirror 30, the light receiving light guide mirror 50, and the light receiving lens 60, in addition to the polygon mirror 41. The shaping of the laser light by the emission lens 20 and the condensing of the reflected light by the light receiving lens 60 are also realized by refraction of light. Therefore, the emission lens 20 and the light receiving lens 60 are also included in the optical members.

With the configuration described above, the light source substrate 10, the scanning substrate 44, the light receiving substrate 70, and the main control substrate 80 are located at positions not overlapping with the polygon mirror 41 in the depth direction. Also, the optical members other than the polygon mirror 41 are located so as not to overlap with the polygon mirror 41 in the depth direction.

According to the configuration described above, the length (that is, the thickness) of the laser radar device 1 in the depth direction can be prevented from increasing by the thickness of the substrate located on the depth side of the polygon mirror 41 due to the placement of the substrate or the like on the depth side of the polygon mirror 41. In other words, the depth D of the laser radar device 1 can be reduced.

In addition, the optical members other than various substrates and the polygon mirror 41 are located so as to be located in front of the mirror innermost position 411. According to the configuration described above, the depth D of the laser radar device 1 is determined according to a size of the polygon mirror 41, a thickness of a member forming the housing 100, and a separation in the depth direction between the polygon mirror 41 and the housing. Therefore, according to the configuration described above, the depth D of the laser radar device 1 can be brought closer to a limit value determined according to the depth length of the polygon mirror 41 as the member having the maximum depth length. The thickness direction of the substrate means a direction perpendicular to the plane of the substrate.

Further, according to the embodiment, the main control substrate 80 has only to be connected to the light source substrate 10 and the scanning substrate 44, and is not restricted by the positional relationship with the optical members such as the light receiving lens 60. Therefore, the main control substrate 80 can be placed in an empty space remaining in the housing 100 after the optical member, the light source substrate 10, the scanner 40, the light receiving substrate 70, and the like have been placed. For that reason, according to the configuration described above, the space inside the housing 100 can be efficiently utilized, and a volume of the housing 100 as a whole can be reduced. Further, since the degree of freedom of the installation position of the main control substrate 80 is high, for example, the main control substrate 80 is located in the vicinity of the relay connector provided in the housing 100, thereby being capable of shortening a routing distance of the cable in the housing 100.

Furthermore, in the embodiment described above, since the laser diode 11 and the light receiving device 71 are mounted on separate substrates, the alignment of the laser diode 11 on the optical member of the emission system and the alignment of the light receiving device 71 on the optical member of the light receiving system can be implemented, independently. In addition, placement that can prevent an interference with the light receiving system by the emitted light can be employed.

In addition, in the configuration described above, a path of the laser light from the laser diode 11 to the polygon mirror 41 is bent into an L-shape in a front view with the use of the emission light guide mirror 30, and a path from the polygon mirror 41 to the light receiving device 71 is bent into an inverted L shape with the use of the light receiving light guide mirror 50. As a result, the path is located so as to face each other across a center optical path extending in the vertical direction through the polygon mirror 41 (in other words, divided into left and right). According to the configuration described above, since the light source substrate 10 and the light receiving substrate 70 are not aligned in the vertical direction, the height H of the housing 100 can be reduced.

Further, according to the present embodiment, the light receiving light guide mirror 50, which is a relatively large optical member, is located between the light source substrate 10 and the light receiving substrate 70. The light receiving light guide mirror 50 can prevents the laser light emitted from the laser diode 11 provided on the light source substrate 10 from reaching the light receiving device 71. In other words, the light receiving light guide mirror 50 also functions as a shielding member for separating the optical system and the light receiving system from each other. As a result, erroneous detection of an object caused by the light receiving device 71 receiving the laser light emitted from the laser diode 11 can be prevented.

The embodiments of the present disclosure have been described above. However, the present disclosure is not limited to the above-described embodiments, and various modifications described below also fall within the technical scope of the present disclosure. Further, the present disclosure can be implemented with various changes without departing from the spirit of the present disclosure, aside from the following modifications. Further, the embodiment described above and the various modifications to be described below can be implemented in combination as appropriate without any contradiction.

The members having the same functions as those in the members described in the above embodiment are denoted by the identical reference numerals, and a description of the same members will be omitted. Further, when referring to only a part of the configuration, the configuration of the embodiment described above can be applied to other portions.

[Modification 1]

In the embodiment described above, the configuration in which the path of the laser light from the laser diode 11 to the polygon mirror 41 (hereinafter referred to as the emission optical path) and the path from the polygon mirror 41 to the light receiving device 71 (hereinafter referred to as the light receiving optical path) are bent in the L-shape (that is, at a right angle) in a front view with the use of the emission light guide mirror 30 and the light receiving light guide mirror 50 is exemplified, but the present disclosure is not limited to the above configuration.

Figure 7:
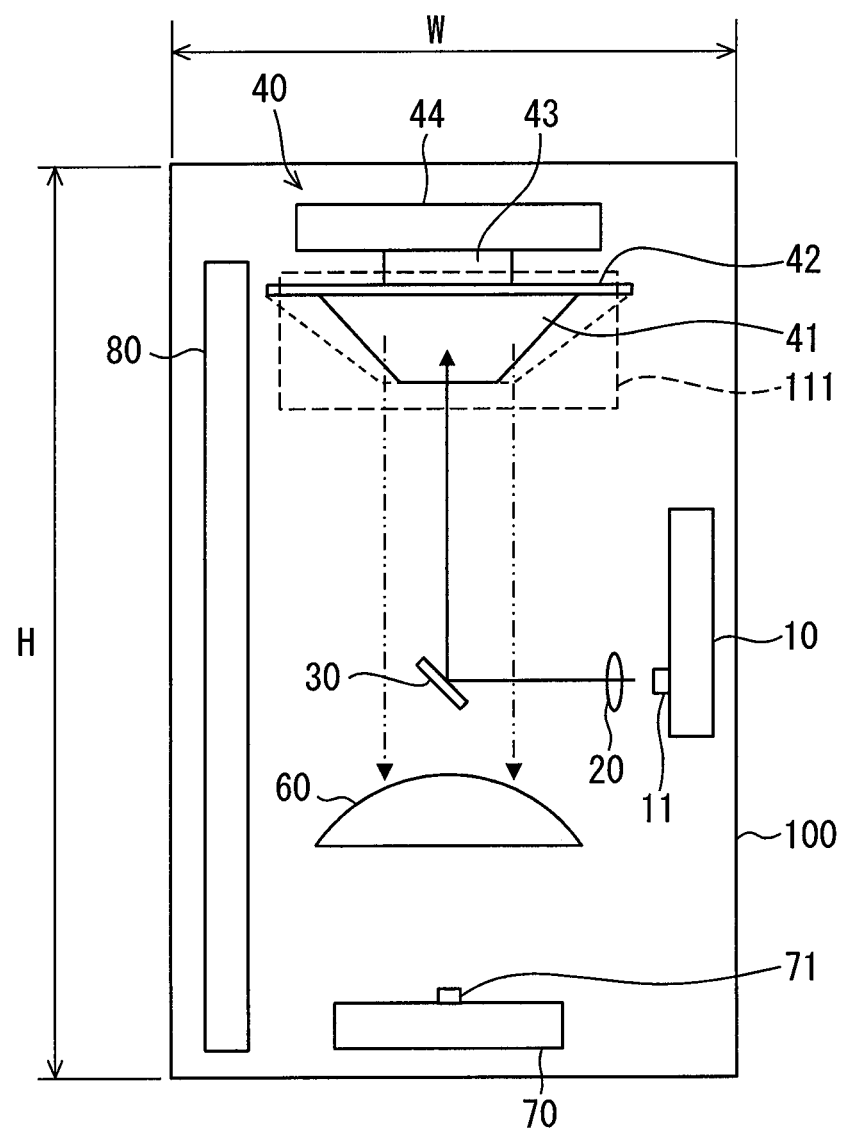
FIG. 7 is a front view showing a laser radar device 1 in Modification 1.
Figure 8:
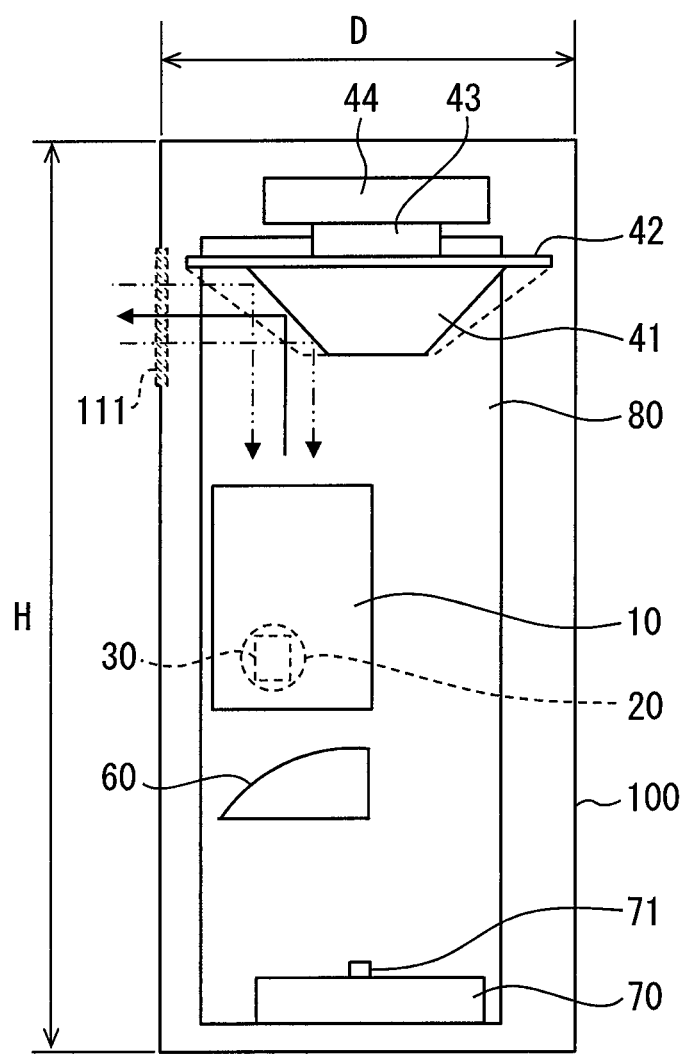
FIG. 8 is a side view showing the laser radar device 1 in Modification 1.

For example, as shown in FIGS. 7 and 8, the light receiving lens 60 and the light receiving substrate 70 may be located below the polygon mirror 41 without the use of the light receiving light guide mirror 50 so that the reflected light reflected by the polygon mirror 41, and guided into the housing may be directly incident on the light receiving lens 60. FIG. 7 is a diagram corresponding to FIG. 2 of the embodiment, and is a front view of the laser radar device 1 according to Modification 1 in which a front portion 110 is seen through. FIG. 8 is a view corresponding to FIG. 4 of the embodiment, and is a right side view showing the right surface portion 120 of the laser radar device 1 in the first modification.

Reflected light incident on the light receiving lens 60 in the configuration shown in FIGS. 7 and 8 is converged on the light receiving device 71 arranged below the light receiving lens 60. However, in the case where the light receiving optical path is linear, it is assumed that the emission optical path is bent in the width direction from the rotation axis direction of the polygon mirror 41 with the use of the emission light guide mirror 30. This is because a certain degree of separation is provided between the light receiving device 71 and the laser diode 11.

According to the configuration disclosed in FIGS. 7 and 8 as Modification 1, the light receiving light guide mirror 50 included in the embodiment described above can be omitted. The light receiving light guide mirror 50 is a member having a relatively large area as described above. According to the configuration of Modification 1, since the member having a large area can be omitted, the volume of the laser radar device 1 can be reduced as compared with that in the embodiment described above.

In another embodiment, the light receiving light guide mirror 50 may be used, and the emission light guide mirror 30 may not be used so that the emission optical path may be linear and the light receiving optical path may be bent. At least one of the emission optical path and the light receiving optical path has only to be bent in the width direction with the use of a member (hereinafter referred to as a bending member) that bends the path (hereinafter referred to as the optical path) of the laser light, such as the emission light guide mirror 30 and the light receiving light guide mirror 50.

In the above description, the configuration in which the various optical paths such as the emission optical path or the light receiving optical path are bent in the L-shape in the front view is exemplified. However, an angle of bending the optical path by the bending member is not limited to 90 degrees (that is, right angle). Other angles such as 60 degrees or 45 degrees may be applied. The fact that the optical path is L-shaped corresponds to bending at a right angle, but the right angle in the present specification includes a substantially right angle. A substantially right angle means, for example, a range from 80 degrees to 100 degrees and a range from 260 degrees to 280 degrees.

(Modification 2)

Figure 9:
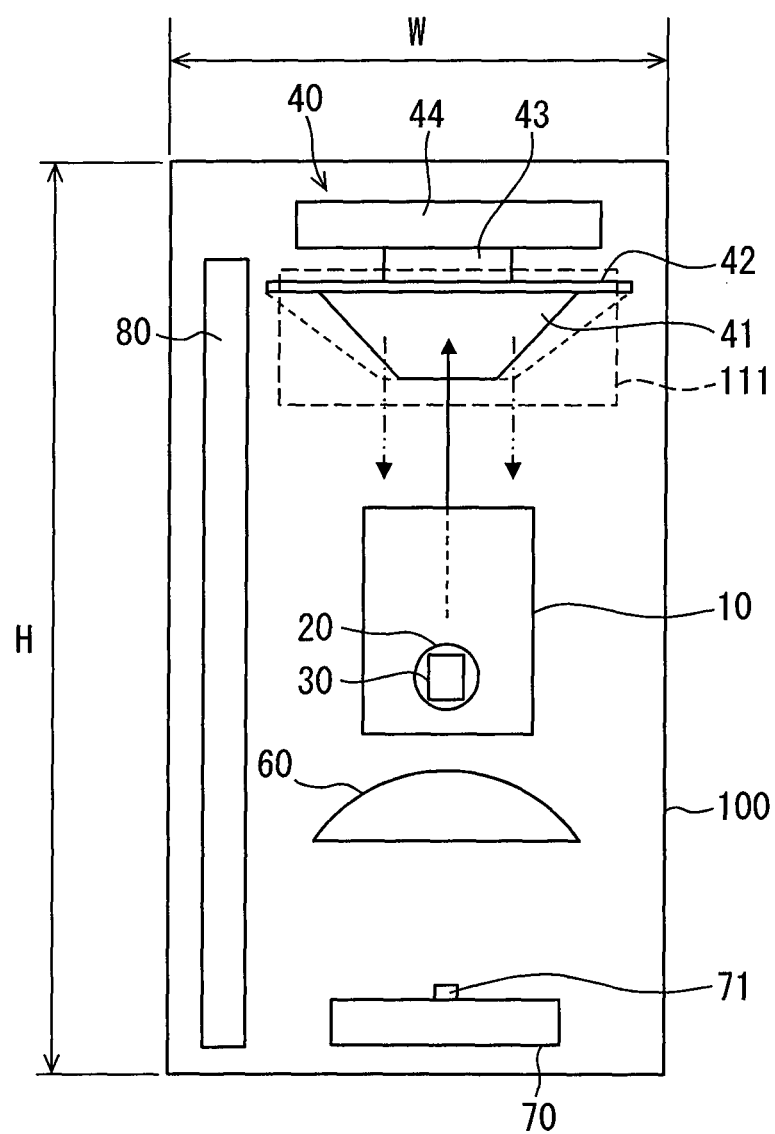
FIG. 9 is a front view showing a laser radar device 1 in Modification 2.
Figure 10:
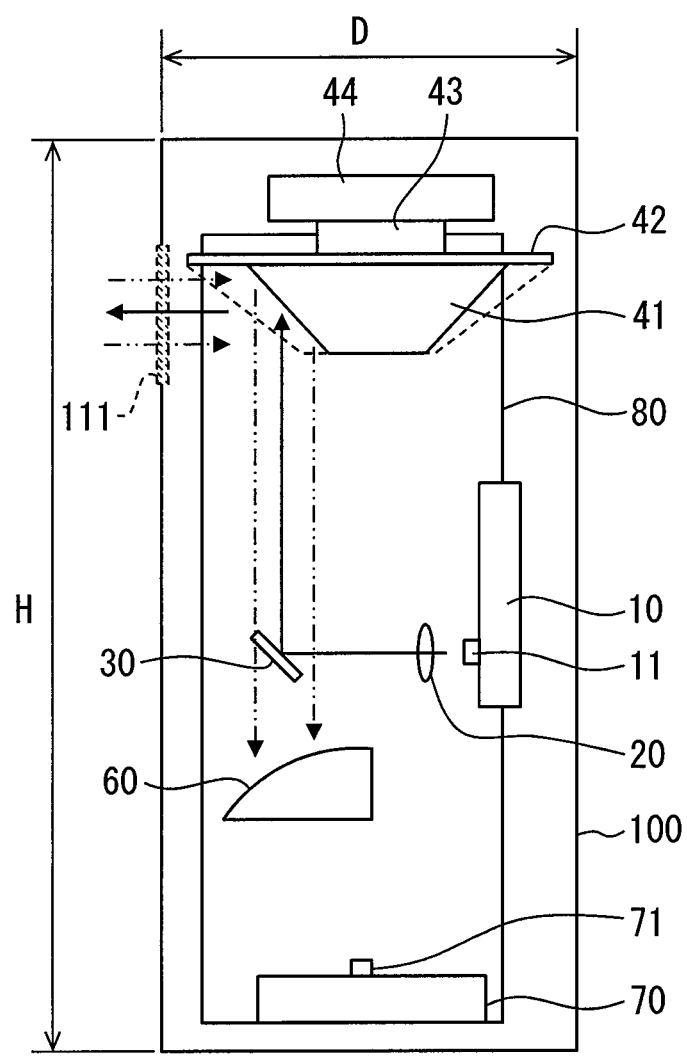
FIG. 10 is a side view showing the laser radar device 1 in Modification 2.

In addition, the emission optical path and the light receiving optical path formed with the use of the bending member are not necessarily formed to be parallel to the front portion 110 in an entire stroke. For example, as shown in FIGS. 9 and 10, the light source substrate 10 may be located so as to face the back surface portion so that the optical path from the laser diode 11 to the emission light guide mirror 30 is parallel to the depth direction, and the laser light travels from the depth side to the front side. In that case, the emission light guide mirror 30 is located in a posture reflecting the laser light traveling from the depth side of the housing to the front side to the upper side of the housing. The light source substrate 10 is located so as to be on the front side of the mirror innermost position 411.

FIG. 9 is a diagram corresponding to FIG. 2 of the embodiment, and is a front view in which the front portion 110 of the laser radar device 1 is seen through in Modification 2. FIG. 10 is a diagram corresponding to FIG. 3 of the embodiment, and is a right side view of the laser radar device 1 in which the right surface portion 120 is seen through in Modification 2.

As shown in FIG. 10, the emission optical path configured as described above is formed to have an L shape in a side view when the right surface portion 120 of the housing 100 is seen through. Even with the configuration described above, the same effects as those of the embodiment described above can be obtained. Further, according to the configuration disclosed as Modification 2, the length W in the width direction can be reduced as compared with the configurations of the above-described embodiment and Modification 1.

In FIGS. 9 and 10, the light source substrate 10 is located such that the laser light is directed from the depth side to the front side, but the present disclosure is not limited to the above example. The light source substrate 10 may be located so that the laser light travels from the front side to the depth side. In the above description, the configuration in which the respective members are located so as to bend the emission optical path in the depth direction or the opposite direction is exemplified, but the present disclosure is not limited to the above example. The respective members may be located so as to bend the light receiving optical path in the depth direction or the opposite direction.

(Modification 3)

In the above-described embodiment and Modifications 1 and 2 (hereinafter referred to as embodiments and the like), the configuration in which the light source substrate 10 and the light receiving substrate 70 are formed as separate substrates has been disclosed, but the present disclosure is not limited to the above configuration. The light source substrate 10 and the light receiving substrate 70 may be integrally formed as one substrate. Hereinafter, the above configuration will be described as Modification 3 with reference to FIGS. 11 and 12.

Figure 11:
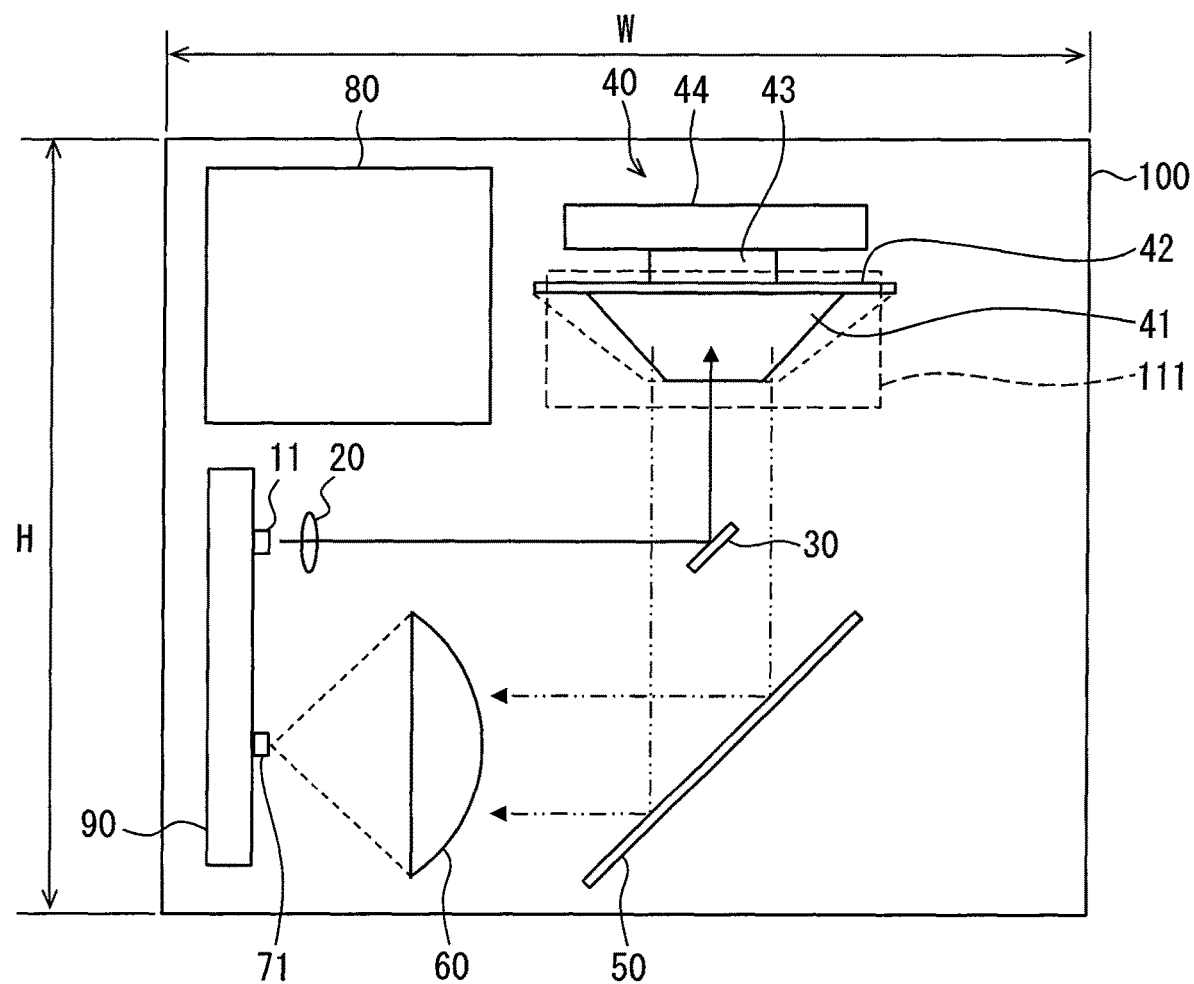
FIG. 11 is a front view showing a laser radar device 1 in Modification 3.
Figure 12:
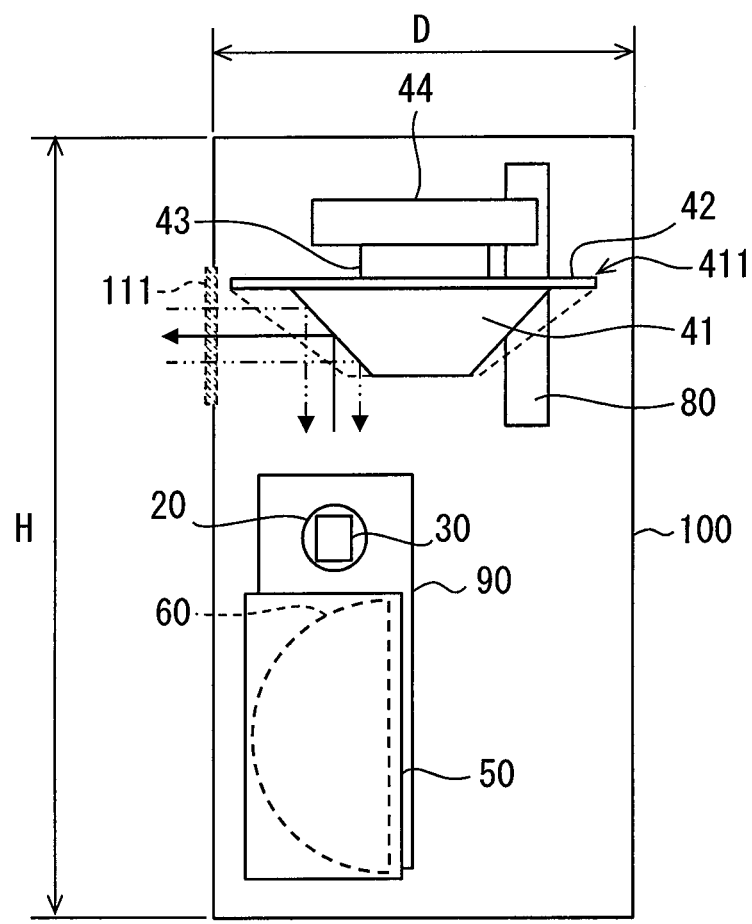
FIG. 12 is a side view showing the laser radar device 1 in Modification 3.

FIG. 11 is a diagram corresponding to FIG. 2 of the embodiment, and is a front view in which the front portion 110 of the laser radar device 1 is seen through in Modification 3. FIG. 12 is a diagram corresponding to FIG. 3 of the embodiment, and is a right side view of the laser radar device 1 in which the right surface portion 120 is seen through in Modification 3.

The laser radar device 1 according to Modification 3 includes a substrate (hereinafter referred to as an integrated substrate) 90 on which the functions of the light source substrate 10 and the light receiving substrate 70 described above are installed. In other words, the laser diode 11, the light receiving device 71, the amplifier for amplifying the light reception signal output from the light receiving device 71, and the like are located on the integrated substrate 90.

As an example, the configuration in which the integrated substrate 90 is located in a posture facing the left surface portion of the housing 100 on the left side of the internal space of the housing 100 is disclosed, but the placement configuration of the integrated substrate 90 is not limited to the above example. The integrated substrate 90 may be located on the right side of the internal space of the housing 100 in a posture facing the right surface portion of the housing 100. The emission light guide mirror 30 may be located at a position and an angle at which the laser light emitted from the laser diode 11 is reflected directly above toward the reflection surface of the polygon mirror 41. Further, the light receiving light guide mirror 50 may be located at a position and at an angle at which the reflected light reflected by the polygon mirror 41 is reflected in the direction in which the light receiving lens 60 is present. In an example shown in FIGS. 11 and 12, the emission light guide mirror 30 and the light receiving light guide mirror 50 are located in a posture inclined at a predetermined angle of 45 degrees on the center optical path.

According to the above configuration disclosed as Modification 3, the number of substrates accommodated in the housing 100 can be reduced as compared with that in the embodiment described above and the like. For that reason, the number of wires (for example, flexible cables) connecting between the substrates can be reduced. In addition, since a mechanism for holding the substrate can be reduced, the housing 100 can be resultantly reduced in size. Furthermore, since the number of substrates to be attached to the housing 100 is reduced, the number of assembly steps of the laser radar device 1 is reduced, and the manufacturing cost can be reduced.

The configuration of the embodiment described above and the like has an advantage that the degree of freedom of placement of the respective members is higher than that of Modification 3. Further, as disclosed in Modification 3, in the configuration in which the light receiving device 71 and the laser diode 11 are located on the same substrate, the difficulty in alignment with the optical members tends to increase. This is because, for example, when the integrated substrate 90 is moved so that the light receiving device 71 is positioned at a focal point on the left side of the light receiving lens 60, the position of the laser diode 11 may deviate from the focal point of the emission lens 20. In view of the circumstances described above, the configuration in which the light receiving device 71 and the laser diode 11 are provided on separate substrates as in the embodiment described above and the like, as compared with the configuration of Modification 3, there is an advantage that difficulty in alignment with the optical members can be reduced.

(Modification 4)

In the embodiment described above, the configuration in which the substrate on which a circuit (hereinafter referred to as a main control circuit unit) that provides a function of controlling the operation of the entire laser radar device 1 is mounted is provided as the main control substrate 80 separately from the light source substrate 10 and the light receiving substrate 70 is disclosed. However, the present disclosure is not limited to the above configuration. The main control circuit unit may be provided on any one of the light source substrate 10, the scanning substrate 44, and the light receiving substrate 70. In other words, any one of the light source substrate 10, the scanning substrate 44, and the light receiving substrate 70 may be integrally formed with the main control substrate 80. Even with the configuration described above, since the number of substrates accommodated in the housing 100 can be reduced, the number of wires connecting between the substrates can be reduced and the number of assembly steps can be reduced.

(Modification 5)

In the above description, the configuration in which a planar mirror is used as a member (that is, a bending member) that changes the traveling direction of the laser light by a predetermined angle is exemplified, but the present disclosure is not limited to the above configuration. The bending member may be a parabolic mirror. Also, the optical path may be bent by refraction instead of reflection.

The bending member utilizing the refraction of light may be made of a transparent material such as synthetic resin or glass. The shape of the bending member may be designed to provide a desired bending angle.

(Modification 6)

The mechanism for sweeping and irradiating the laser light is not limited to the configuration in which the polygon mirror 41 is rotated. For example, the laser light may be swept and irradiated with the use of a MEMS (Micro Electro Mechanical Systems) mirror. Further, the planar mirror may be rotated with the use of a motor to sweep and irradiate the laser light. In addition, the irradiation direction of the laser light can be changed with the use of a well-known configuration. The polygon mirror 41, the MEMS mirror, the planar mirror for emitting the laser light to the outside of the housing, and the like correspond to a scanning mirror.

Incidentally, when a relatively large detection area is to be provided, the configuration using the planar mirror tends to be upsized more than the configuration using the polygon mirror. In other words, the use of the polygon mirror as in the embodiment described above or the like can perform both of the formation of a relatively large detection area and the miniaturization of the housing 100.

(Other Modifications)

In the above description, the case where the polygon mirror 41 is the innermost member is exemplified, but the present disclosure is not limited to the above case. For example, the light receiving lens 60 may be the innermost member. In such a case, various substrates are located at positions not overlapping with the light receiving lens 60 in the depth direction. Further, the various substrates may be located so as to be located on the front side of the innermost side end portion of the light receiving lens 60.

Further, in the embodiment described above, the configuration on the premise that the laser radar device 1 and the ECU 2 are wired is disclosed, but the present disclosure is not limited to the above configuration. The laser radar device 1 and the ECU 2 may be wirelessly connected to each other. In that case, the connector 84 of the main control substrate 80 can be omitted. Instead, a communication module for wireless communication with the ECU 2 is accommodated in the housing 100.

The laser radar device described above obtains the information on the distance to the target existing in the detection area corresponding to the angle range with the sweeping and irradiation of the laser light in a predetermined angle range.

The laser radar device includes the light source substrate 10, the emission lens 20, the scanning mirror 41, the scanning substrate 44, the light receiving substrate 70, the light receiving lens 60, and the housing 100. The laser light source for outputting the laser light is located on the light source substrate 10. The emission lens 20 shapes and outputs the laser light output from the laser light source. The scanning mirror 41 is a mirror for reflecting the laser light output from the emission lens toward the outside of the housing and is configured so as to change its posture relative to the laser light source. The scanning substrate 44 controls the posture of the scanning mirror relative to the laser light source. The light receiving device is located on the light receiving substrate 70, and receives the reflected light which is the laser light reflected on the target and outputs the electric signal corresponding to the intensity of the received reflected light. The light receiving lens 60 condenses the reflected light on the light receiving device. The housing 100 houses the light source substrate 10, the emission lens 20, the scanning mirror 41, the scanning substrate 44, the light receiving substrate 70, and the light receiving lens 60. The innermost member is one of the emission lens, the scanning mirror, and the light receiving lens having the end portion on an innermost side of the housing in the depth direction. The light source substrate, the scanning substrate, and the light receiving substrate are located at positions not to overlap with the innermost member in the depth direction of the housing.

With the configuration described above, the light source substrate, the scanning substrate, and the light receiving substrate are located at the positions that do not overlap with the innermost member in the depth direction, which is the optical member having an end portion on the innermost side in the depth direction of the housing among the various optical members. The term "optical member" as used in the present specification refers to a member that reflects or refracts the laser light, such as the emission lens, the scanning mirror, and the light receiving lens. Further, the depth direction of the housing corresponds to a direction opposite to the direction in which the center of the angle range where the laser light is irradiated (that is, the optical axis for the laser radar device) is directed.

According to the configuration described above, the length (that is, the thickness) of the laser radar device in the depth direction can be prevented from increasing by the substrate due to the placement of the substrate on the depth side of the optical member. In other words, the thickness of the laser radar device 1 can be reduced.

The present disclosure is described based on the embodiments, and it is understood that this disclosure is not limited to the embodiments or the structure. The present disclosure includes various modification examples and modifications within the same range. In addition, it should be understood that various combinations or aspects, or other combinations or aspects, in which only one element, one or more elements, or one or less elements is included to the various combinations or aspects, are included in the scope or the technical idea of the present disclosure.

The invention claimed is:

1. A laser radar device configured to acquire distance information on a target, which exists in a detection area corresponding to a predetermined angle range, by sweeping and irradiating a laser light in the angle range, the laser radar device comprising:

a light source substrate on which a laser light source to output the laser light is located;

an emission lens configured to shape the laser light from the laser light source and to output the laser light;

a scanning mirror configured to reflect the laser light from the emission lens toward an outside of a housing and to change a posture of the scanning mirror relative to the laser light source;

a scanning substrate configured to control the posture of the scanning mirror relative to the laser light source;

a light receiving substrate on which a light receiving device is located, the light receiving device configured to receive a reflected light, which is the laser light reflected on the target, and to output an electric signal corresponding to an intensity of the received reflected light;

a light receiving lens configured to condense the reflected light on the light receiving device; and the housing that houses the light source substrate, the emission lens, the scanning mirror, the scanning substrate, the light receiving substrate, and the light receiving lens, wherein an innermost member is the scanning mirror having an end portion on an innermost side of the housing in a depth direction, and the scanning mirror is configured to reflect the reflected light in a direction orthogonal to the depth direction, the laser radar device further comprises:

a light receiving path bending member configured to reflect or refract the reflected light reflected on the scanning mirror to change a traveling direction of the reflected light, wherein the light receiving path bending member is located in a posture to reflect the reflected light, which is incident from the scanning mirror in a direction orthogonal to the depth direction, in a direction where the scanning mirror is not present and the light receiving lens and the light receiving substrate are located in a direction along which the light receiving path bending member reflects the reflected light incident from the scanning mirror, the laser radar device further comprises:

an emission path bending member configured to reflect or refract the laser light from the laser light source to change the traveling direction of the laser light, wherein the light source substrate is located to output the laser light from the laser light source in a direction perpendicular to the depth direction of the housing and to allow the output laser light to be incident to the scanning mirror via the emission path bending member, and the scanning mirror is configured to sweep and irradiate the laser light incident from the emission path bending member in the angel range, wherein all the light source substrate, the scanning substrate, the light receiving substrate, the light receiving path bending member, and the emission path bending member are located at positions not to overlap with the innermost member in the depth direction of the housing.

2. The laser radar device according to claim 1, wherein the scanning mirror is configured to reflect the reflected light in a direction orthogonal to the depth direction, the laser radar device further comprises:

a light receiving path bending member configured to reflect or refract the reflected light reflected on the scanning mirror to change a traveling direction of the reflected light, wherein the light receiving path bending member is located in a posture to reflect the reflected light, which is incident from the scanning mirror in a direction orthogonal to the depth direction, in a direction where the scanning mirror is not present, and the light receiving lens and the light receiving substrate are located in a direction along which the light receiving path bending member outputs the reflected light incident from the scanning mirror.

3. The laser radar device according to claim 2, wherein the emission path bending member and the light receiving path bending member are located in a predetermined order on a straight line through which the reflected light reflected by the scanning mirror passes, and the light receiving substrate is located on an opposite side of the light source substrate across the straight line in the housing.

4. The laser radar device according to claim 1, wherein the emission path bending member is located to change the traveling direction of the laser light from the laser light source at a right angle.

5. The laser radar device according to claim 1, wherein the light receiving path bending member is located to change the traveling direction of the reflected light at a right angle.

6. The laser radar device according to claim 1, further comprising:

an optical member configured to reflect or refract the laser light, in the depth direction; and a main control substrate located in the housing and communicably connected to the light source substrate, the scanning substrate, and the light receiving substrate, the main control substrate configured to control the emission of the laser light from the laser light source and to generate the distance information based on a time from the emission of the laser light to the reception of the reflected light by the light receiving device, wherein the light source substrate, the light receiving substrate, the scanning substrate, and the main control substrate are located at positions not to overlap with the optical member.

7. The laser radar device according to claim 6, wherein the main control substrate is located in a posture in which thickness direction of the main control substrate is parallel to the depth direction.

8. The laser radar device according to claim 1, further comprising:

a main control circuit unit located in one of the light source substrate, the light receiving substrate, and the scanning substrate, wherein the main control circuit unit is configured to control the emission of the laser light from the laser light source and to generate the distance information based on a time from the emission of the laser light to the reception of the reflected light by the light receiving device.

9. The laser radar device according to claim 1, wherein the light source substrate and the light receiving substrate are formed integrally with each other as one substrate.

10. The laser radar device according to claim 1, wherein the scanning mirror includes a polygon mirror having a plurality of reflection surfaces inclined with respect to its rotation axis, the laser radar device further comprising:

a motor configured to rotate the polygon mirror about the rotation axis and located on the scanning substrate, wherein the polygon mirror of the scanning mirror is configured to reflect the reflected light from the target in a direction parallel to the rotation axis.

11. The laser radar device according to claim 1, wherein the laser radar device is mounted on a vehicle to provide the detection area outside the vehicle.

12. The laser radar device according to claim 1, wherein a diameter of the scanning mirror is along the depth direction, an outer diameter of the scanning mirror is larger than, in the depth direction, all of:
 a length of the light source substrate;
 a length of the scanning substrate;
 a length of the light receiving substrate;
 a length of the light receiving path bending member; and
 a length of the emission path bending member.

13. The laser radar device according to claim 12, wherein the light receiving path bending member is a light receiving light guide mirror, the emission path bending member is an emission light guide mirror, the light receiving path bending member is located between the laser light source and the light receiving device, and the light receiving light guide mirror is larger than the emission light guide mirror.

14. The laser radar device according to claim 1, wherein the light source substrate, the light receiving substrate, the light receiving path bending member, and the emission path bending member are located at positions below the scanning mirror relative to a vertical direction of the laser radar device.

* * * * *